(12) United States Patent
Matsuda

(10) Patent No.: US 6,869,324 B2
(45) Date of Patent: Mar. 22, 2005

(54) SMALL WATERCRAFT

(75) Inventor: Yoshimoto Matsuda, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/357,535

(22) Filed: Feb. 3, 2003

(65) Prior Publication Data

US 2003/0148679 A1 Aug. 7, 2003

(30) Foreign Application Priority Data

Feb. 7, 2002 (JP) ..................................... 2002-030203

(51) Int. Cl.⁷ .............................................. B63H 21/10
(52) U.S. Cl. ............... 440/88 C; 440/88 L; 440/88 HE
(58) Field of Search .................................. 440/38, 88 C, 440/88 D, 88 G, 88 J, 88 HE, 88 P, 89 C, 88 R, 88 L (56) References Cited

U.S. PATENT DOCUMENTS

| | | | | |
|---|---|---|---|---|
| 3,292,373 A | * | 12/1966 | Hiroshi | 60/221 |
| 5,330,374 A | * | 7/1994 | Ishino | 440/42 |
| 5,885,121 A | * | 3/1999 | Nanami et al. | 440/88 R |
| 5,921,829 A | * | 7/1999 | Iwata | 440/88 R |
| 6,524,149 B1 | * | 2/2003 | Hattori | 440/88 L |
| 6,544,085 B1 | * | 4/2003 | Menard et al. | 440/88 C |

* cited by examiner

*Primary Examiner*—Ed Swinehart
(74) *Attorney, Agent, or Firm*—Kolisch Hartwell, P.C.

(57) ABSTRACT

Disclosed is a small watercraft having an engine cooling system which can lessen variation in temperature and temperature distribution of the engine between the time when the engine is starting and when the watercraft is continuously driving with a throttle in a fully open or almost fully open position. The small watercraft adapted to be propelled by a water jet pump driven by an engine, comprises: a first cooling system for cooling a cylinder block of the engine, the first cooling system having an indirect cooling structure; and a second cooling system for cooling an exhaust system, the second cooling system having a direct cooling structure.

21 Claims, 8 Drawing Sheets

SMALL WATERCRAFT

BACKGROUND OF THE INVENTION

1. Field of the Invention

The present invention relates to a small watercraft such as a personal watercraft (PWC) which ejects water rearward and hydroplanes as the resulting reaction. More particularly, the present invention relates to a cooling system of an engine or the like of the small watercraft.

2. Description of the Related Art

In recent years, so-called water-jet propulsion personal watercraft, which are one type of small watercraft, have been widely used in leisure, sport, rescue activities, and the like. The water-jet propulsion personal watercraft is configured to have a water jet pump that pressurizes and accelerates water sucked from a water intake generally provided on a bottom surface of a hull and ejects it rearward from an outlet port. Thereby, the personal watercraft is propelled.

In the water-jet propulsion personal watercraft, a steering nozzle provided behind the outlet port of the water jet pump is swung either to the right or to the left by operating a bar-type steering handle to the right or to the left, to change the ejection direction of the water to the right or to the left, thereby turning the watercraft to the right or to the left.

In a propulsion engine of the small watercraft including the water-jet propulsion personal watercraft, a temperature and a temperature distribution of the engine vary between the time when the engine is starting and when the watercraft is continuously driving with the engine throttle in a fully open or almost fully open position. This causes slight deformation of the engine. In particular, in the case of an engine designed to minimize a clearance between a piston and a cylinder bore for the purpose of reducing lubricating oil consumption or a piston lap noise, slight deformation of the cylinder bore would lead to a noise or the like.

SUMMARY OF THE INVENTION

The present invention addresses the above-described condition, and an object of the present invention is to provide a small watercraft having an engine cooling system which can lessen variation in temperature and temperature distribution of an engine for the watercraft between the time when the engine is starting and when the watercraft is continuously driving with a throttle in a fully open or almost fully open position.

According to the present invention, there is provided a small watercraft adapted to be propelled by a water jet pump driven by an engine, comprising: a first cooling system for cooling a cylinder block of the engine, the first cooling system having an indirect cooling structure; and a second cooling system for cooling an exhaust system, the second cooling system having a direct cooling structure.

The indirect cooling structure means a cooling system having a cooling structure in which a cooling passage (cooling jacket) inside the engine is configured in a closed loop, and a cooling medium (primary coolant) flowing within the closed loop cools the engine and is cooled by an external means such as a cooler. The direct cooling structure means a cooling system having a cooling structure in which a cooling medium taken in from the outside cools the engine and is thereafter discharged outside the watercraft. The cylinder block means a member comprised of a cylinder within which a piston slides and a cooling jacket provided around the cylinder to allow the coolant therethrough. The exhaust system means a member (e.g., exhaust manifold) connected to an exhaust port of the engine for introducing an exhaust gas of the engine to the outside and having a cooling jacket inside thereof through which the coolant flows.

In the small watercraft having such a cooling structure, since the cooling system of the cylinder block of the engine has the indirect cooling structure, it is possible to lessen variation in temperature and temperature distribution of the engine between the time when the engine is starting and when the watercraft is continuously driving with the throttle in a fully open or almost fully open position. Thereby, since deformation of a cylinder bore of the cylinder block is lessened, it is possible to minimize a clearance between a piston and a cylinder. Consequently, oil consumption and a piston lap noise of the engine can be reduced. Also, since the cooling system of the exhaust system employs the direct cooling structure having higher cooling capability, the exhaust system which would tend to increase its temperature is effectively cooled.

Preferably, the second cooling system having the direct cooling structure serves to cool a cylinder head. In this system, the cylinder head, which would tend to elevate in temperature due to a flow of an exhaust gas, is effectively cooled.

The cylinder head means a member mounted on an end portion of the cylinder block so as to close the cylinder to thereby form a combustion chamber of the engine and have a cooling jacket inside thereof through which the coolant flows.

Preferably, an oil may be used as a primary coolant of the indirect cooling structure and may be circulated in a closed loop of the indirect cooling structure by an oil pump. Such oil cooling is helpful in lessening variation in temperature distribution of the cylinder block.

Preferably, in the closed loop, the oil may be fed from an oil tank to a cooling jacket of the cylinder block by the oil pump, the oil may then flow through a lubricating path inside the engine while lubricating components of the engine, and the oil may be returned into the oil tank by a scavenging pump. Such a cooling structure eliminates a need for a feed pump for feeding an oil to lubricate components of the engine. The components requiring lubrication generally refers to a portion (e.g., crank bearing) which required to be forcibly lubricated by the oil inside the engine.

Preferably, a cooler for the oil provided in the closed loop may be mounted (attached) on a casing of the water jet pump. With this structure, heat exchange is efficiently performed by water flowing through the inside the water jet pump, and the number of components for the cooling system and cost of the cooler are reduced.

Preferably, the cooler may be attached (mounted) to a bottom portion of the casing of the water jet pump. In this structure, the cooler is readily accessible from outside the watercraft, i.e., from the direction of the bottom of the watercraft, to allow the coolant to be easily changed.

Preferably, the cooler may have heat exchange fins protruding from the casing of the water jet pump into a heat exchange chamber provided in the cooler so as to allow the oil to flow therein. With this structure, the cooler easily achieves high heat exchange capability.

Preferably, cooling water may be used as a primary coolant of the indirect cooling structure and is circulated in a closed loop of the indirect cooling structure by a cooling water circulating pump. In this case, inexpensive water is used as a coolant.

Preferably, the cooler may have fins protruding from the casing of the water jet pump into a heat exchange chamber provided in the cooler so as to allow the cooling water to flow therein. With this structure, the cooler easily achieves high heat exchange capability.

The above and further objects and features of the invention will be more fully be apparent from the following detailed description with accompanying drawings.

BRIEF DESCRIPTION OF THE DRAWINGS

FIGS. 5A–5C are views showing a structure of a cooler provided on a water jet pump in FIGS. 2 and 3, in which

FIGS. 6A–6C are views showing a structure of a cooler provided on a water jet pump according to another embodiment, in which

DETAILED DESCRIPTION OF THE PREFERRED EMBODIMENTS

Hereinafter, preferred embodiments of a water-jet propulsion small watercraft of the present invention will be described with reference to the accompanying drawings.

Figure 7:
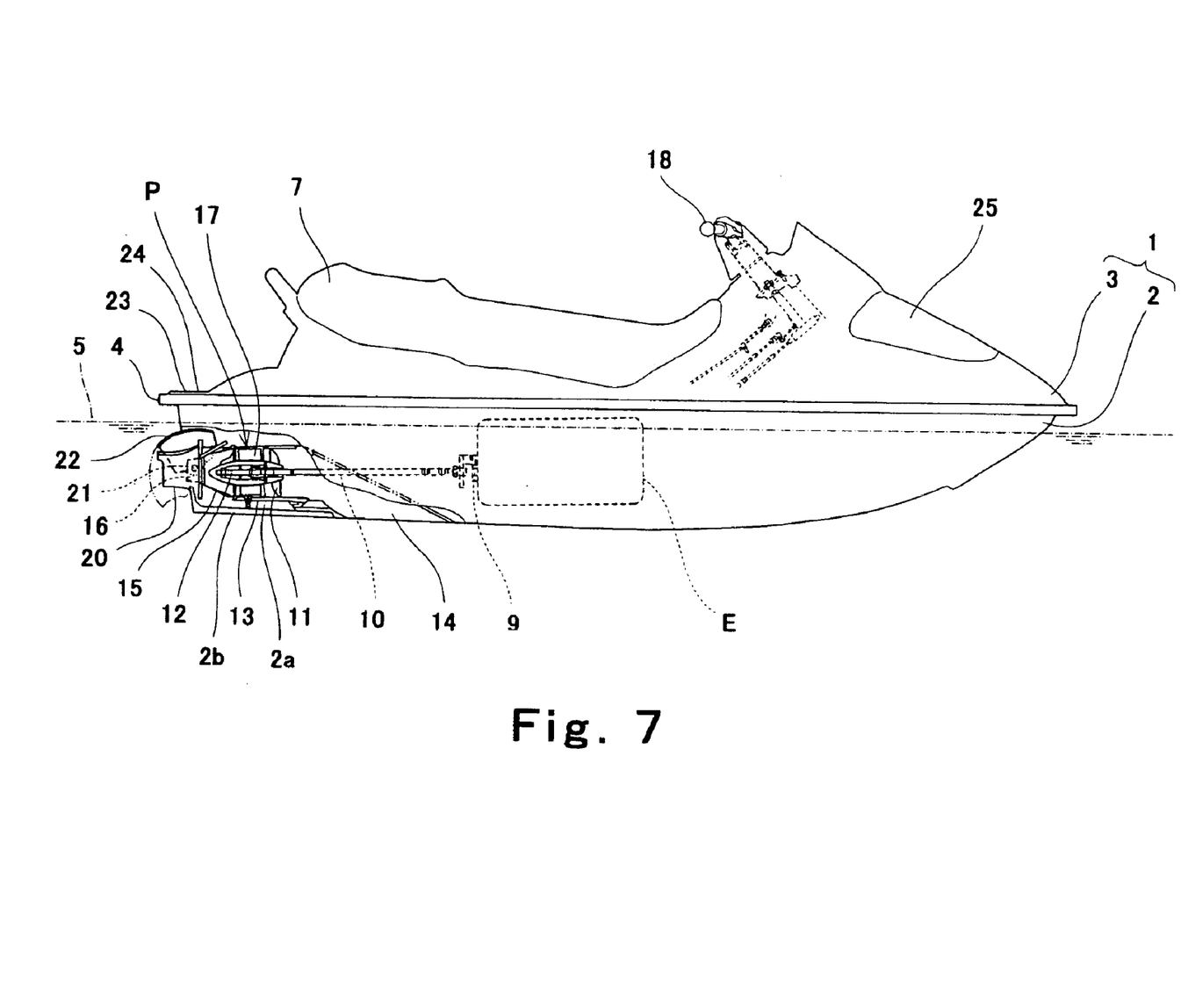
FIG. 7 is a side view showing an entire water-jet propulsion small watercraft to which the present invention is applied.
Figure 8:
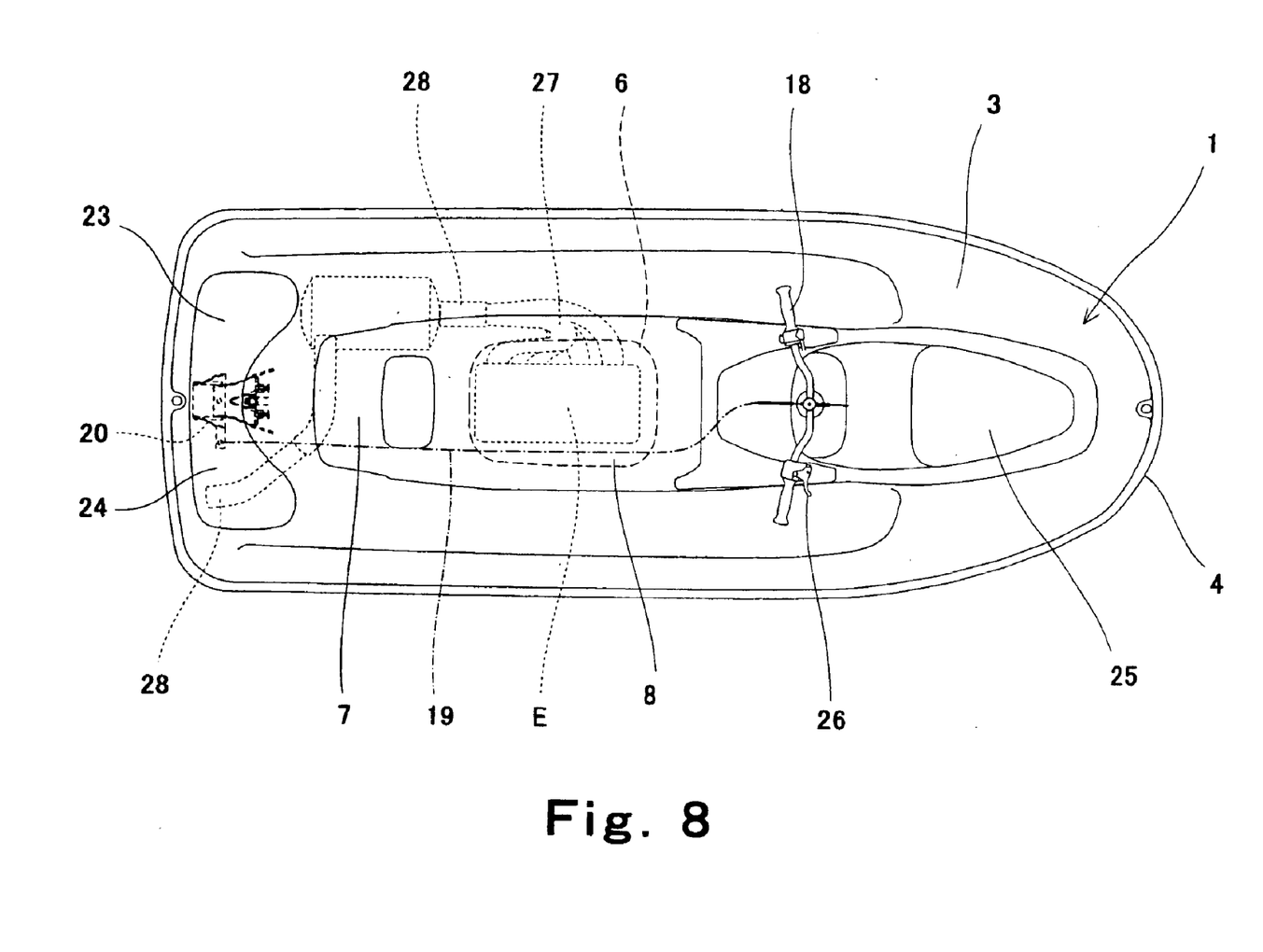
FIG. 8 is a plan view showing the entire small watercraft in FIG. 7.

Referring now to FIGS. 7 and 8, a body 1 of the water-jet propulsion small watercraft comprises a hull 2 and a deck 3 covering the hull 2 from above. A line at which the hull 2 and the deck 3 are connected over the entire perimeter thereof is called a gunnel line 4. In this embodiment, the gunnel line 4 is located above a waterline 5 of the small watercraft.

As shown in FIG. 8, an opening 6, which has a substantially rectangular shape seen from above, is formed at a relatively rear section of the deck 3 over an upper surface of the body 1 such that it extends in the longitudinal direction of the body 1, and a straddle-type seat 7 is provided over the opening 6. An engine E is disposed in a chamber (engine room) 8 surrounded by the hull 2 and the deck 3 below the seat 7 and having a convex shape in a cross section of the body 1.

The engine E has multiple cylinders (e.g., four cylinders) and is a four-cycle engine. As shown in FIG. 7, the engine E is mounted such that a crankshaft 9 extends along the longitudinal direction of the body 1. A water jet pump P for propelling the watercraft is mounted in a pump room 2a formed on a rear end portion of the hull 2. An output end of the crankshaft 9 is rotatably coupled integrally with a pump shaft 12 of the water jet pump P through a propeller shaft 15. An impeller 11 is attached on the pump shaft 12 of the water jet pump P. The impeller 11 is covered with a pump casing 13 on the outer periphery thereof.

A water intake 14 is provided on a bottom of the hull 2. The water is sucked and taken in from the water intake 14 and fed to the water jet pump P through a water intake passage. The water jet pump P pressurizes and accelerates the water. The pressurized and accelerated water is discharged through a pump nozzle 15 having a cross-sectional area of flow gradually reduced rearward, and from an outlet port 16 provided on the rear end of the pump nozzle 15, thereby obtaining a propulsion force. Fairing vanes 17 for fairing a water flow inside the water jet pump P is attached on the pump casing 13.

A bar-type steering handle 18 is provided forward of the seat 7. By operating the steering handle 18 to the right or to the left, the steering nozzle 20 provided behind the pump nozzle 15 swings to the right or to the left through a wire cable 19 indicated by a dashed line in FIG. 8. Thereby, the watercraft can be turned to any desired direction while the water jet pump P is generating a propulsion force.

As shown in FIG. 7, a bowl-shaped reverse deflector 22 is provided above the rear side of the steering nozzle 20 such that it can swing downward around a horizontally mounted swinging shaft 21. The deflector 22 is swung downward toward a lower position behind the steering nozzle 20 to deflect the water ejected from the steering nozzle 20 forward, and as the resulting reaction, the personal watercraft moves rearward.

As shown in FIGS. 7 and 8, a rear deck 23 formed at a stern part of the watercraft is provided with an operable hatch cover 24. A rear compartment with a small capacity is provided under the hatch cover 24. A front hatch cover 25 is provided on a fore part of the watercraft. A front compartment (not shown) is provided under the front hatch cover 25 for storing equipment and the like. As shown in FIG. 8, a throttle lever 26 is provided at an end portion of the steering handle 18, for adjusting an engine speed. An exhaust pipe 28 extends at the stern part to discharge an exhaust gas from an exhaust manifold 27 mounted to the engine E outside the watercraft.

Embodiment 1

Figure 1:
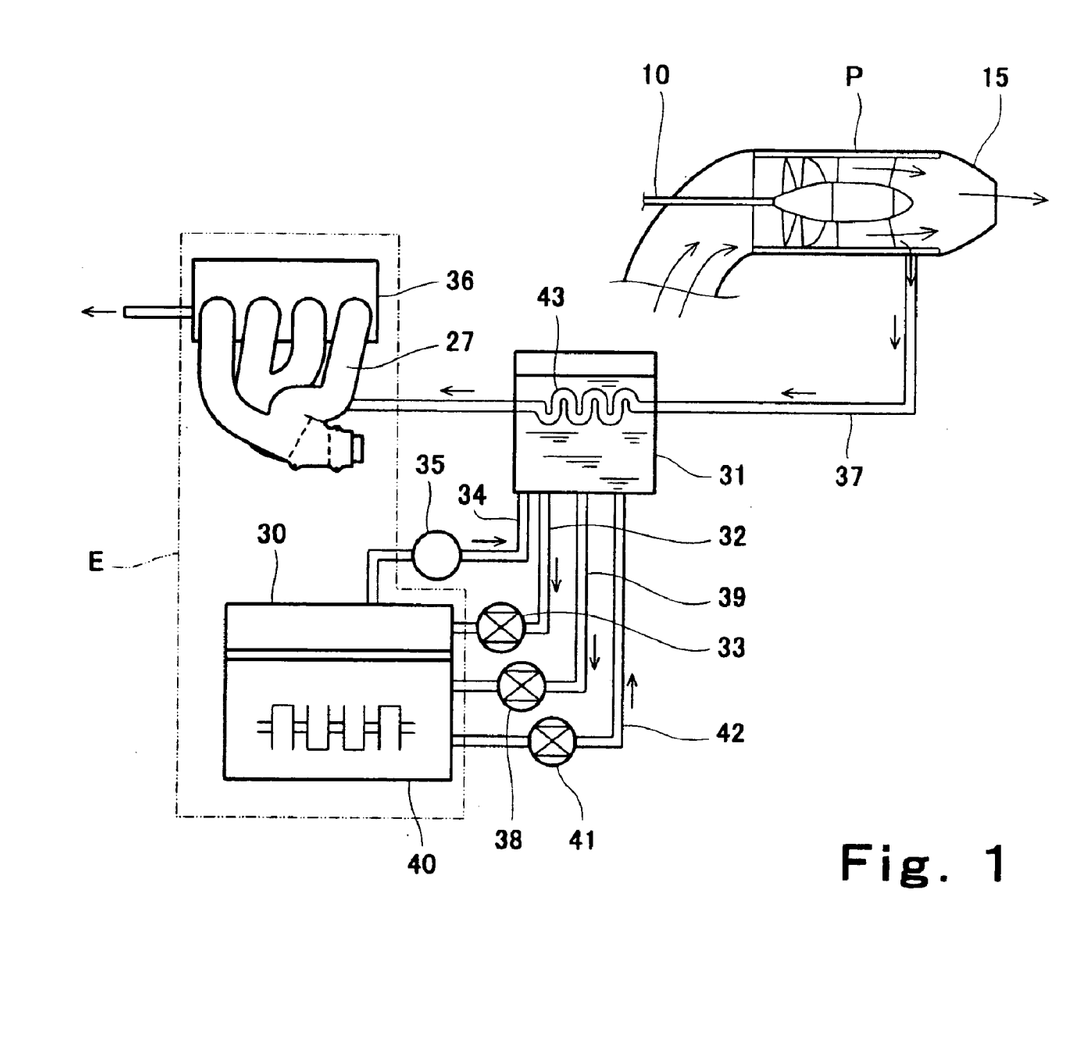
FIG. 1 is schematic view showing an engine cooling system of a small watercraft according to a first embodiment of the present invention.

The water-jet propulsion personal watercraft according to an embodiment of the present invention has a cooling system schematically shown in FIG. 1. As shown in FIG. 1, an oil tank 31 is provided independently of the engine E. A low-temperature oil is pumped by an oil pump 33 to be delivered from the oil tank 31 into a cooling jacket inside a cylinder block 30 of the engine E through an oil pipe 32. The oil cools the cylinder block 30 and increases its temperature, and the resulting oil is returned into the oil tank 31 through an oil pipe 34. That is, a flow path of the oil is formed in a closed loop. The oil pipe 34 is provided with a thermostat valve 35 inside thereof to be adapted to open at a predetermined temperature or higher.

Meanwhile, low-temperature water from outside the watercraft is taken in as cooling water by the water jet pump P and is led into a cooling passage (cooling jacket) inside an exhaust manifold 27 through a cooling water supply line 37 and then into a cooling jacket of a cylinder head 36. The cooling water cools the exhaust manifold 27 and the cylinder head 36 and is thereafter discharged outside the watercraft. That is, a flow path of the cooling water is formed in an open loop.

The oil is pumped by a feed pump 38 to be delivered from the oil tank 31, through an oil pipe 39, and to components 40 of the engine E that require lubrication, for example, a plurality of bearings of the crankshaft, a cylinder liner and the like below the piston, and lubricates these components. The oil that has lubricated the components 40 of the engine E is returned into the oil tank 31 by a scavenging pump 41 through an oil pipe 42.

A cooler (oil cooler) 43 is provided inside the oil tank 31, for functioning by the cooling water being supplied from the water jet pump P. The cooler 43 serves to cool the oil that has cooled the cylinder block 30 of the engine E and has an increased temperature, or the oil that has lubricated the components 40 of the engine E and has an increased temperature. In this embodiment, the cooling water being delivered to the cooling passage of the exhaust manifold 27 serves as a cooling medium of the cooler 43. This advantageously reduces piping of the cooling water.

The personal watercraft having the above-mentioned cooling system functions as follows. Upon starting the engine E, the temperature of the cylinder block 30 quickly increases, at which time the thermostat valve 35 is at a closed position. When the temperature of the cylinder block 30 reaches a predetermined temperature, for example, 90° C., the valve 35 opens, thereby causing the low-temperature oil to be fed from the oil tank 31 to the cylinder block 30. The oil cools the cylinder block 30. The oil inside the oil tank 31 is effectively cooled by the cooler 43.

Meanwhile, upon starting the engine E, the cooling water from the water jet pump P is supplied to the exhaust manifold 27 and the cylinder head 36, and effectively cools the exhaust manifold 27 and the cylinder head 36, which would otherwise increase their respective temperatures in a short time due to a combustion gas.

In accordance with the above-described cooling system, since the cylinder block 30 of the engine E has a closed-loop indirect cooling system using the oil as a primary coolant, variation in temperature and temperature distribution of the engine E is lessened between while the engine is starting and while the watercraft is continuously driving in the state in which the throttle is in a fully open or almost fully open position.

Thereby, since the deformation of the cylinder bore is lessened, it is possible to minimize the clearance between the piston and the cylinder. Consequently, lubricating oil consumption and the piston lap noise can be reduced. Meanwhile, an exhaust system such as the exhaust manifold 27, the cylinder head 36 of the engine E, and the like employs an open-loop direct cooling system in which the cooling water is taken in from outside the watercraft by the water jet pump P and cools these components, and the used cooling water is thereafter discharged outside the watercraft. The direct cooling system produces higher cooling capability to cool the exhaust system such as the exhaust manifold 27, the cylinder head 36, and the like which would tend to increase their temperatures to be higher than the other components.

Embodiment 2

Figure 2:
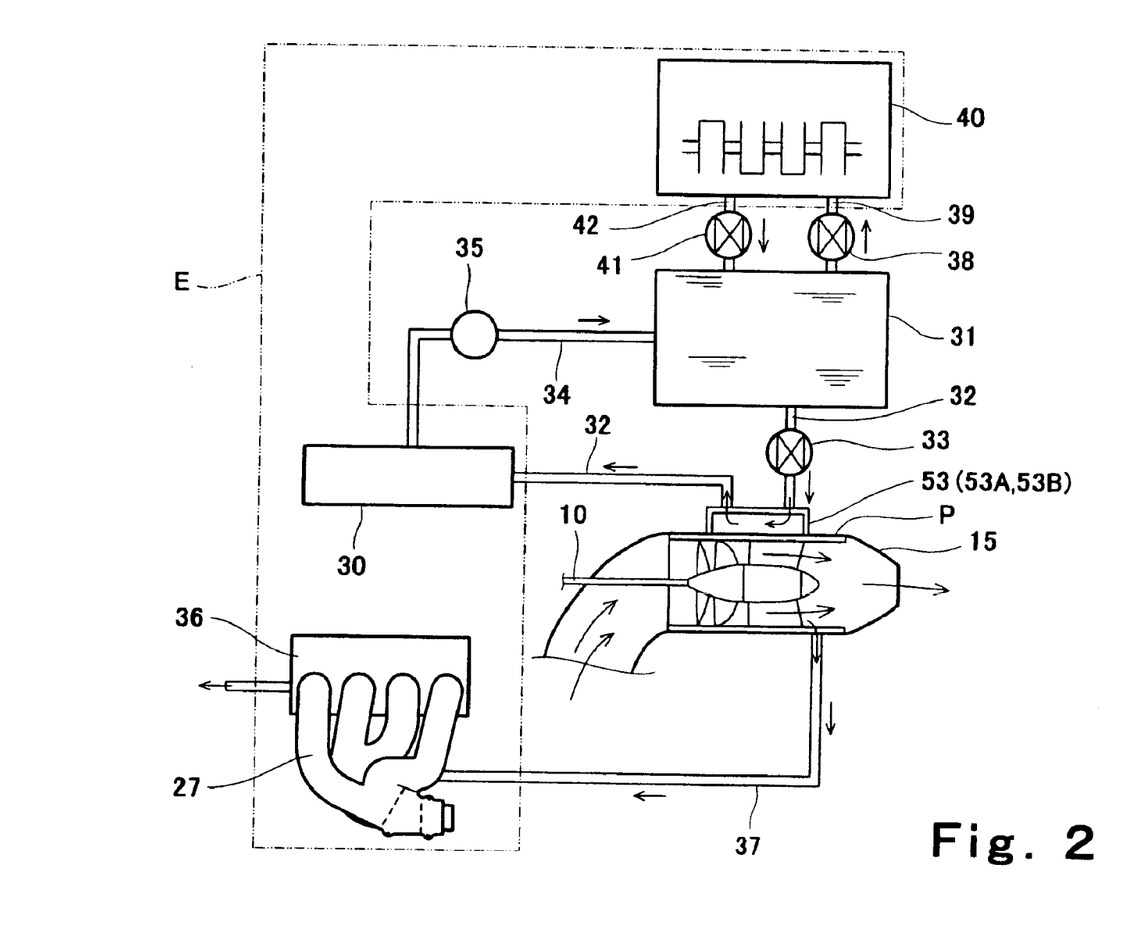
FIG. 2 is a schematic view showing en engine cooling system of a small watercraft according to a second embodiment of the present invention.

FIG. 2 shows another cooling system. In the system in FIG. 2, an oil cooler 53 is provided in the oil pipe 32 through which the oil is delivered from the oil tank 31 to the cooling jacket of the cylinder block 30 of the engine E by the oil pump 33.

Figures 5A, 5B, 5C:
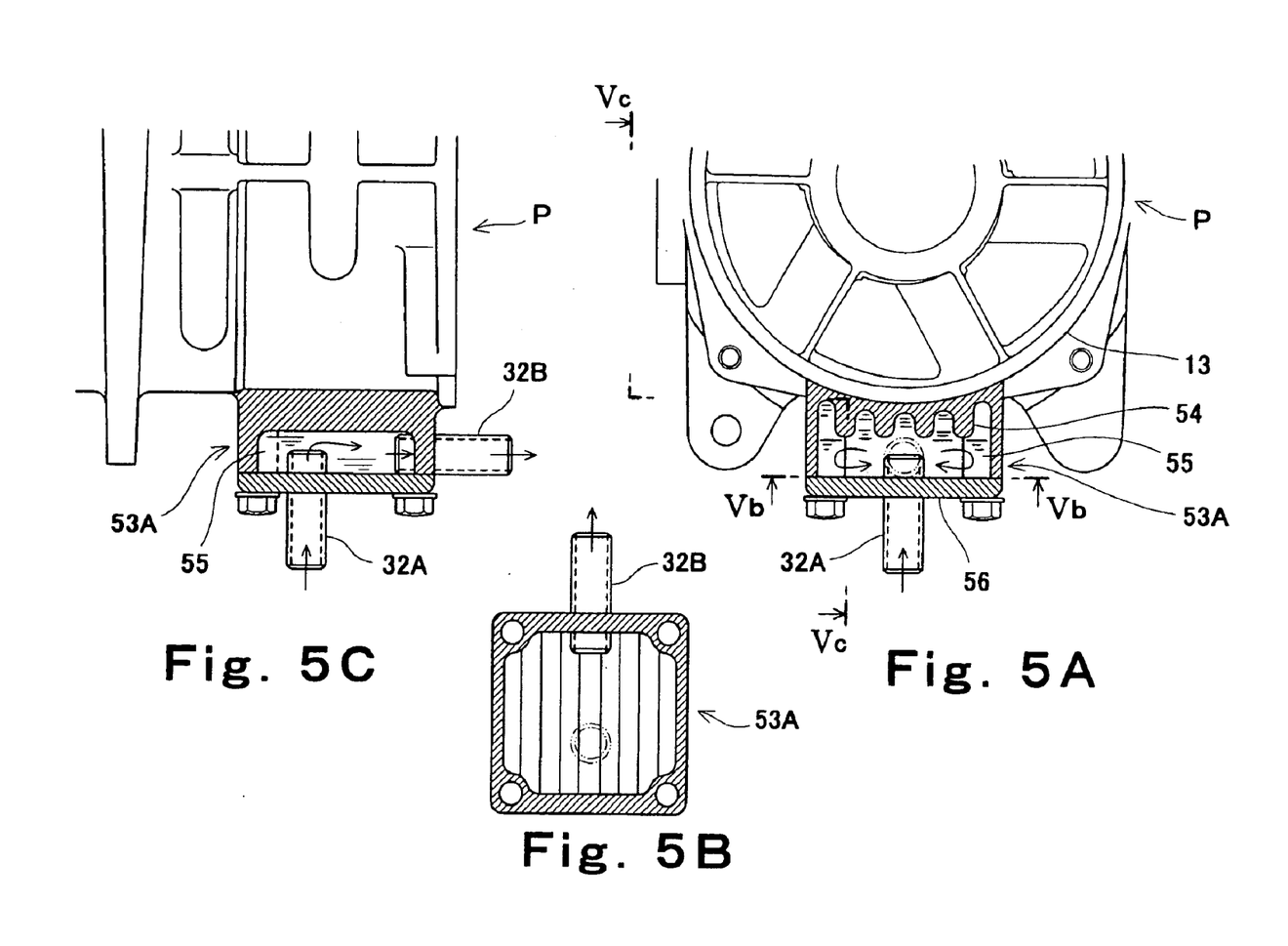
FIG. 5A is a transverse sectional view of the water jet pump.
FIG. 5B is a view taken in the direction of arrows along line Vb—Vb in FIG. 5A.
FIG. 5C is a view taken in the direction of arrows along line Vc—Vc in FIG. 5A.
Figure 6A:
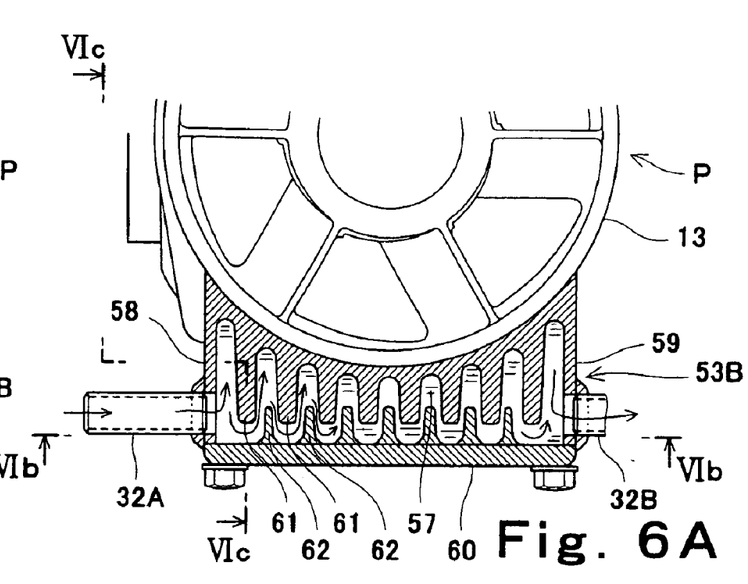
FIG. 6A is a transverse sectional view of the water jet pump.
Figure 6B:
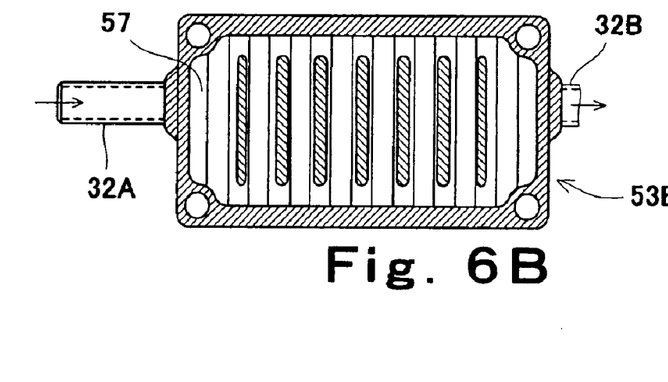
FIG. 6B is a view taken in the direction of arrows along line VIb—VIb in FIG. 6A.
Figure 6C:
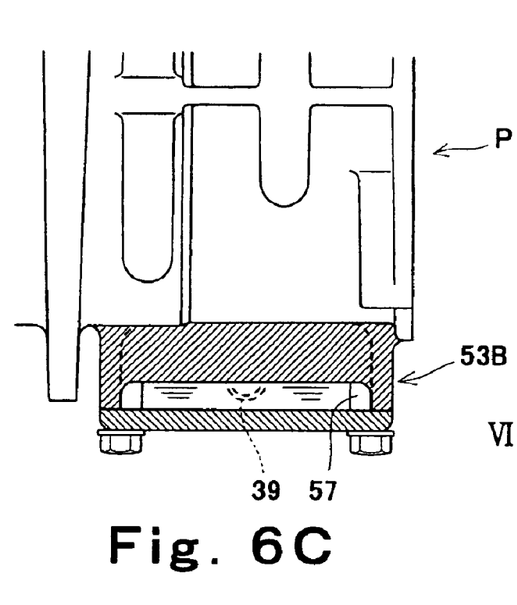
FIG. 6C is a view taken in the direction of arrows along line VIc—VIc in FIG. 6A.

FIGS. 5A–5C and 6A–6C show two examples of the oil cooler 53. An oil cooler 53A in FIGS. 5A–5C and an oil cooler 53B in FIGS. 6A–6C are respectively box-shaped and provided in contact with an outer peripheral wall of the pump casing 13 of the water jet pump P. Such a cooling structure advantageously utilizes cooling capability of the water jet pump P.

The oil cooler 53A in FIGS. 5A–5C is configured such that fins 54 for heat exchange protrude from the pump casing 13 to a center of a heat exchange chamber 55 of the oil cooler 53A. A connecting pipe 32A for connecting the oil pipe is connected to a bottom wall 56 of the heat exchange chamber 55 such that an end of the connecting pipe 32A on an inflow (entrance) side of the heat exchange chamber 55 protrudes into an inside of the heat exchange chamber 55 toward the fins 54. The oil being fed into the heat exchange chamber 55 is diffused to both sides, which enables effective heat exchange. An end portion of a connecting pipe 32B for connecting the oil pipe on an outflow (exit) side is connected to a side wall of the heat exchange chamber 55 at a position apart from the inflow side. The fins 54 are formed to extend in a flow direction of the oil on the outflow side.

The oil cooler 53B in FIGS. 6A–6C has an internal structure in which a contact area between the fins and the oil and residue time of the oil in the heat exchange chamber 55 are increased, for the purpose of higher cooling capability. Specifically, the connecting pipe 32A is connected to a side wall 58 of a heat exchange chamber 57 of the cooler 53B on the inflow side of the heat exchange chamber 57 and the connecting pipe 32B is connected to a side wall 59 opposed to the side wall 58 on outflow side of the heat exchange chamber 57. A plurality of fins 61 are arranged to extend from the pump casing 13 to a vicinity of a bottom wall 60 of the heat exchange chamber 57. The bottom wall of the heat exchange chamber 57 has protrusions 62 extending upwardly from the bottom wall 60 such that each protrusion is located between adjacent two fins 61. The fins 61 and the protrusions 62 create a labyrinth space to permit the oil to flow through a flow path that snakes.

In the personal watercraft in which the oil cooler 53 is provided on the bottom portion of the water jet pump P, the oil cooler 53 is exposed merely by removing a pump cover 2b attached to the bottom portion of the hull 2 of the watercraft so as to cover the pump room 2a from underside the hull 2 (see FIG. 7), and, therefore, preferably, oil change and inspection of the cooler 53 are facilitated.

As shown in FIG. 2, in this system, since the temperature of the oil being fed to the components 40 of the engine E is not greatly increased, the oil is adapted to circulate in the closed loop between the oil tank 31 and the engine E without flowing through an inside of the cooler 53. The cooling system of the cooling water from the water jet pump P to the cylinder head 36 and the exhaust manifold 27 is identical to that of the first embodiment. In FIG. 2, the same reference numerals as those in FIG. 1 are used to identify the same or corresponding parts.

Embodiment 3

Figure 3:
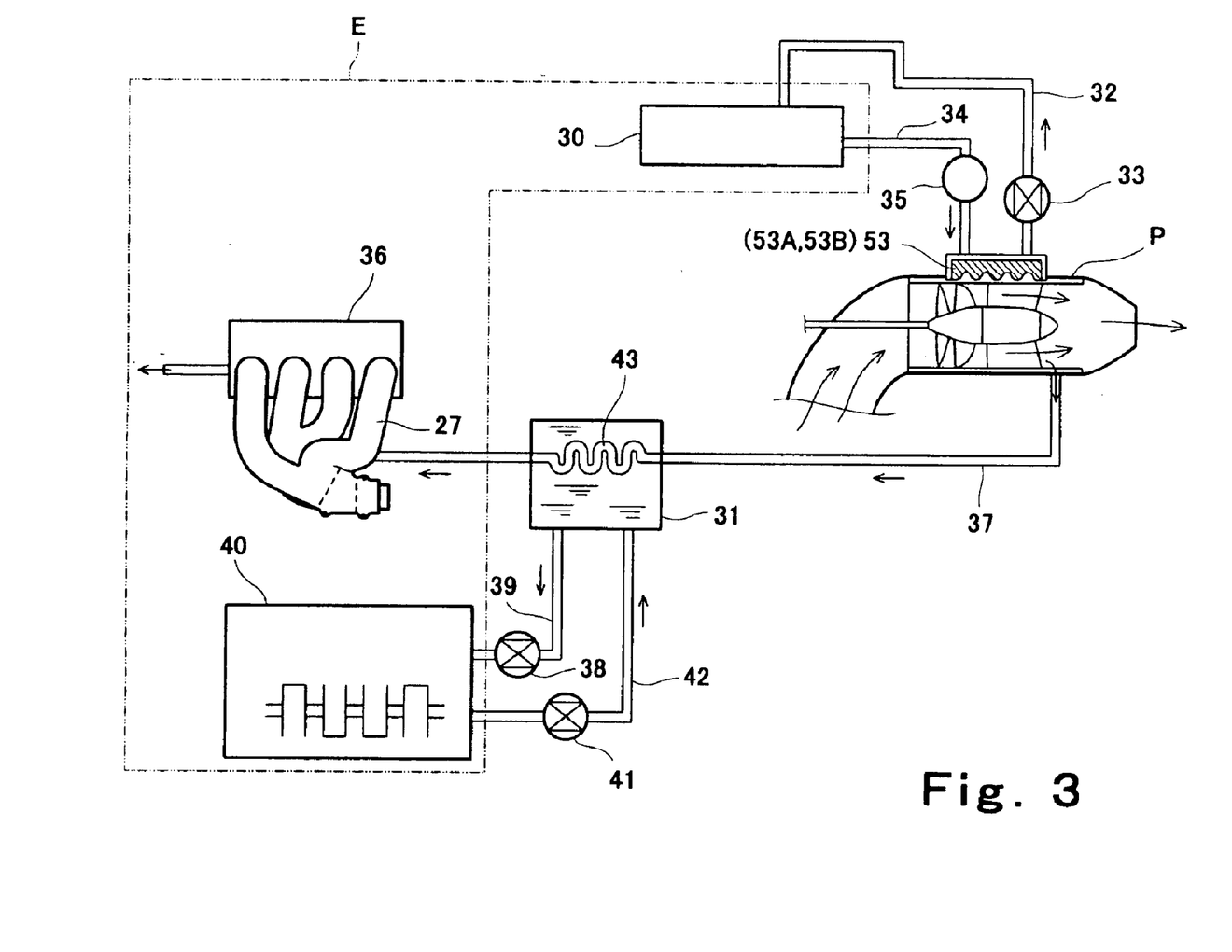
FIG. 3 is a schematic view showing an engine cooling system of a small watercraft according to a third embodiment of the present invention.

As shown in FIG. 3, cooling water (permanent coolant) may be used as a primary coolant for the cylinder block 30 of the engine E. In this cooling system, the cooling jacket of the cylinder block 30 is independently cooled. In this system, as in the second embodiment, the cooling water (permanent coolant) is cooled by a cooler 53 mounted on the outer peripheral wall (pump casing 13) of the water jet pump P. Therefore, this system effectively utilizes the cooling capability of the water jet pump P. This cooling system is identical to those in the first and second embodiments in that the pump 33 for circulating the coolant (in this embodiment, the cooling water) and the thermostat valve 35 for turning on/off circulation of the coolant are provided on the oil pipe 32 and the oil pipe 34, respectively. The cooler 53 may have any one of the structures in FIGS. 5A–5C and 6A–6C as in the first and second embodiments.

As in the first embodiment, the oil is fed from the oil tank 31 to the components 40 of the engine E by the feed pump 38 and is returned from the engine E into the oil tank 31 by the scavenging pump 41. The water from the water jet pump P is supplied to the exhaust manifold 27 and the cylinder head 36 of the engine E to cool these components. A cooler 43 is provided inside the oil tank 31, for cooling the oil inside the oil tank 31 by the water being supplied from the water jet pump P. In FIG. 3, the same reference numerals as those in FIGS. 1 and 2 are used to identify the same or corresponding parts.

Embodiment 4

Figure 4:
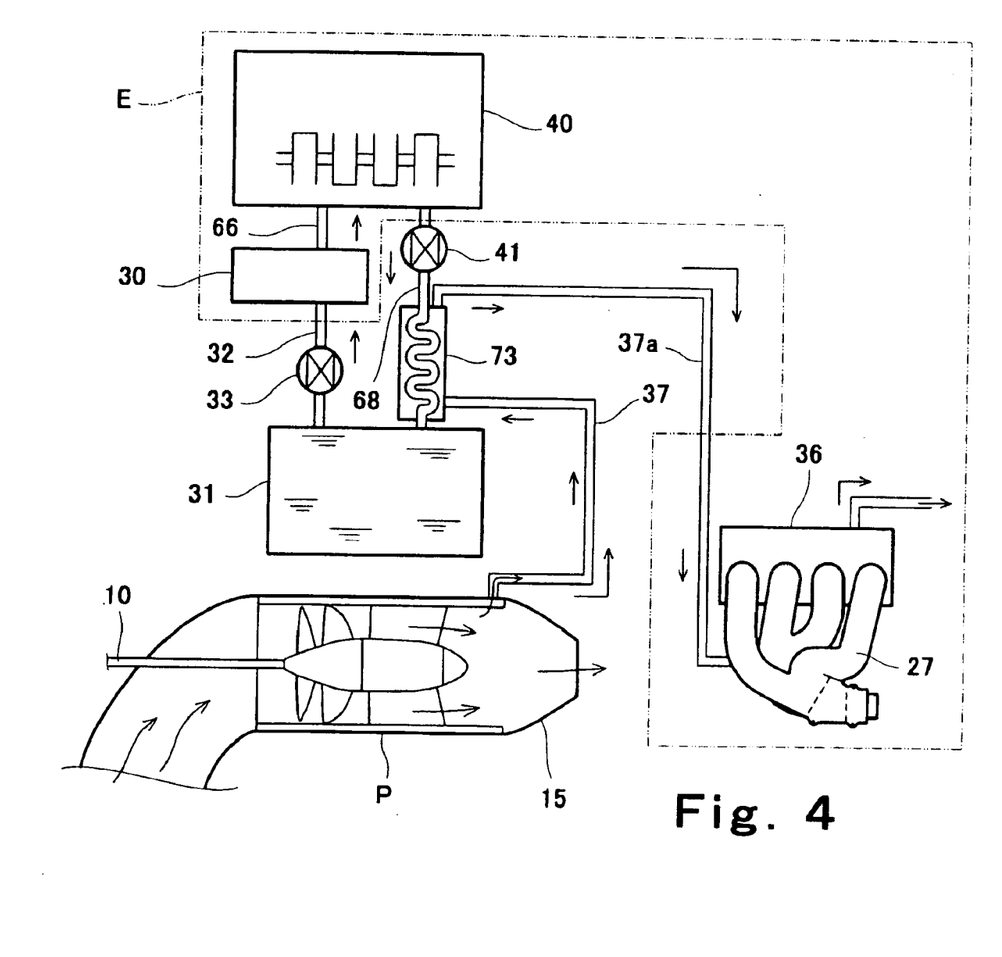
FIG. 4 is a schematic view showing an engine cooling system of a small watercraft according to a fourth embodiment of the present invention.

FIG. 4 shows another system. Specifically, the cooling jacket of the cylinder block 30 of the engine E is connected to the components 40 of the engine E in series through an oil pipe 66. A low-temperature oil is pumped by the pump 33 to be delivered from the oil tank 31 to the cooling jacket of the cylinder block 30 through the oil pipe 32 and is thereafter delivered to the components 40 of the engine E. The oil that has lubricated the components 40 is returned into the oil tank 31 through an oil pipe 68 by the scavenging pump 41.

The cooling water from the water jet pump P is supplied to the exhaust manifold 27 and the cylinder head 36 of the engine E to cool these components. Using this cooling water, a cooler 73 cools the oil flowing through the oil pipe 68. In FIG. 4, the same reference numerals as those in FIGS. 1 to 3 are used to identify the same or corresponding parts.

In the second to fourth embodiments, almost the same function and effects as those in the first embodiment are attained. Since the cylinder block 30 of the engine E has the closed-loop indirect cooling system using the oil (permanent coolant in the system in FIG. 3) as the primary coolant, it is possible to lessen variation in temperature and temperature distribution of the engine E between the time when the engine is starting and when the watercraft is continuously driving with the throttle in a fully open or almost fully open position.

Thereby, since the deformation of the cylinder bore is lessened, it is possible to minimize the clearance between the piston and the cylinder. Consequently, the oil consumption and the piston lap noise can be reduced. Also, the exhaust system such as the exhaust manifold 27 and the cylinder head 36 of the engine E employs the open-loop direct cooling system using the cooling water taken in from outside the watercraft by the water jet pump P. This cooling system produces higher cooling capability to effectively cool the exhaust system such as the exhaust manifold 27 and the cylinder head 36 of the engine E which would tend to increase their temperatures to be higher than the other components.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. A small watercraft adapted to be propelled by a water jet pump driven by an engine, comprising:
    a first cooling system for cooling a cylinder block of the engine, the cylinder block having a cylinder and a cylinder cooling jacket formed around the cylinder, the first cooling system having an indirect cooling structure and including a cooler for cooling a primary coolant, and a closed loop for circulating the primary coolant, the closed loop being formed between the cylinder cooling jacket and the cooler; and
    a second cooling system for cooling an exhaust system and a cylinder head of the engine, the exhaust system having an exhaust system cooling jacket, and the cylinder head having a cylinder head cooling jacket, the second cooling system having a direct cooling structure configured to take in water from outside the watercraft and fed the water to the exhaust system cooling jacket and the cylinder head cooling jacket.

2. The small watercraft according to claim 1, wherein an oil is used as a primary coolant of the first cooling system and wherein the oil is circulated in the closed loop of the first cooling system by an oil pump.

3. The small watercraft according to claim 2, further comprising:
    an oil tank coupled to the closed loop of the first cooling system, wherein the oil pump of first cooling system is configured to pump oil from the oil tank to the cylinder cooling jacket;
    wherein the closed loop of the first cooling system further includes a lubricating path inside the engine, and wherein the oil flows out of the cylinder cooling jacket, through the lubricating path inside the engine while lubricating components of the engine; and
    wherein the first cooling system further includes a scavenging pump coupled to the closed loop, the scavenging pump being configured to return oil to the oil tank, after passing through the lubricating path inside the engine.

4. The small watercraft according to claim 2, wherein the cooler for the oil provided in the closed loop is mounted on a casing of the water jet pump.

5. The small watercraft according to claim 4, wherein the cooler is attached to a bottom portion of the casing of the water jet pump.

6. The small watercraft according to claim 4, wherein the cooler has heat exchange fins protruding from the casing of the water jet pump into a heat exchange chamber provided in the cooler so as to allow the oil to flow therein.

7. The small watercraft according to claim 1, wherein cooling water is used as a primary coolant of the first cooling system and is circulated in the closed loop of the first cooling system by a cooling water circulating pump.

8. The small watercraft according to claim 7, wherein the cooler for the cooling water provided in the closed loop of the first cooling system is mounted on a casing of the water jet pump.

9. The small watercraft according to claim 8, wherein the cooler is attached to a bottom portion of the casing of the water jet pump.

10. The small watercraft according to claim 8, wherein the cooler has fins protruding from the casing of the water jet pump into a heat exchange chamber provided in the cooler so as to allow the cooling water to flow therein.

11. A small watercraft, comprising:
    an engine having a cylinder block and a cylinder head;
    a water jet pump configured to be driven by the engine, and to pressurize and accelerate water from outside the watercraft, to thereby propel the watercraft;
    a first cooling system including a closed-looped passage configured to circulate oil between an oil cooler and a portion of the engine; and a second cooling system including an open-looped passage configured to guide water from outside the watercraft, through a first opening adjacent the water jet pump, to a location adjacent the oil cooler, and to discharge the water outside the watercraft;

wherein the open-looped passage and closed-looped passage are formed in thermal communication with each other at the oil cooler, such that a heat exchange may be performed between the open-looped passage and closed-looped passage, to thereby cool the oil in the first cooling system and warm the water in the second cooling system;

wherein the second cooling system is configured to guide the water to a cooling jacket that cools the cylinder head, after the oil in the closed-loop passage has exchanged heat with the water in the open-looped passage; and wherein all water from outside the watercraft that is supplied to the cylinder head is passed through the heat exchange with the oil cooler, such that the oil cooler may warm the water before it contacts the cylinder head.

12. The small watercraft of claim 11, wherein the portion of the engine cooled by the first cooling system includes a cylinder block.

13. The small water craft of claim 11, wherein the portion of the engine cooled by the first cooling system includes engine components below pistons of the engine.

14. The small watercraft of claim 11, wherein the closed-looped passage is a first closed-loop passage extending to the cylinder block, the small watercraft further comprising a second closed-loop passage configured to circulate oil between a lower portion of the engine and an oil tank.

15. The small watercraft of claim 11, wherein the closed-loop passage includes an oil tank.

16. The small watercraft of claim 15, wherein the oil cooler is formed at least partially by a portion of the open-looped passage extending through the oil tank.

17. The small watercraft of claim 15, wherein the oil cooler is positioned intermediate the tank and a lower portion of the engine, along the closed-looped passage.

18. The small watercraft of claim 11, wherein the closed-looped passage of the first cooling system is a first closed-looped passage, the first cooling system further including a second closed-looped passage fluidically connecting a second cooler formed on a sidewall of the water jet pump with a cylinder block of the engine, the second closed-loop passage containing coolant water, and being configured to guide the coolant water between the cooler and the cylinder block, the cooler being configured to facilitate heat exchange between the water flowing through the water jet pump and the coolant water in the second closed-looped passage.

19. The small watercraft of claim 18, wherein the second cooler includes a plurality of heat exchange fins protruding from the casing of the water jet pump into a heat exchange chamber provided in the cooler so as to allow the coolant water to flow thereby.

20. The small watercraft of claim 19, wherein the second cooler further includes protrusions extending from a bottom wall of the heat exchange chamber to locations between the fins, to thereby form a circuitous passage for coolant water to flow between the fins and protrusions, through the heat exchange chamber.

21. The small watercraft of claim 11, wherein the second cooling system is further configured to guide the water through a cooling passage in an exhaust manifold jacket coupled to the engine.

* * * * *